US008122160B2

(12) United States Patent
Lee et al.

(10) Patent No.: US 8,122,160 B2
(45) **Date of Patent: *Feb. 21, 2012**

(54) DUAL MODE DISPLAYPORT (DP) AND HIGH DEFINITION MULTIMEDIA INTERFACE (HDMI) TRANSMITTER CONFIGURED TO TRANSMIT VIDEO AND/OR AUDIO SIGNALS IN DP OR HDMI ACCORDING TO MODE SIGNAL

(75) Inventors: Yeong-Sheng Lee, Fremont, CA (US); George Shing, Fremont, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,281

(22) Filed: Aug. 9, 2011

(65) Prior Publication Data

US 2011/0302331 A1 Dec. 8, 2011

Related U.S. Application Data

(63) Continuation of application No. 12/365,259, filed on Feb. 4, 2009, now Pat. No. 8,019,906.

(51) Int. Cl.
*H04N 5/38* (2006.01)
*G06F 13/00* (2006.01)

(52) U.S. Cl. ................ 710/14; 710/16; 710/17; 710/18; 710/72; 710/105; 710/316; 348/723; 348/5.093

(58) Field of Classification Search ........................ None
See application file for complete search history.

(56) References Cited

U.S. PATENT DOCUMENTS

| | | | | |
|---|---|---|---|---|
| 7,584,494 | B2 * | 9/2009 | Dow, III | 725/81 |
| 7,677,925 | B2 | 3/2010 | Chuang | |
| 7,716,400 | B2 | 5/2010 | Raines | |
| 7,937,501 | B2 * | 5/2011 | Goodart et al. | 710/2 |
| 2007/0143801 | A1 | 6/2007 | Madonna et al. | |
| 2008/0168519 | A1 | 7/2008 | Rao et al. | |
| 2008/0201756 | A1 | 8/2008 | Shakiba et al. | |
| 2009/0147864 | A1 | 6/2009 | Lida et al. | |

OTHER PUBLICATIONS

"VESA DisplayPort Standard", Video Electronics Standards Association, Version 1, Revision 1a, Jan. 11, 2008, 238 pgs.
Hitachi, Ltd. et al., "High-Definition Multimedia Interface Specification", HDMI Licensing, LLC, Version 1.3a, Nov. 10, 2006, 276 pgs.

* cited by examiner

*Primary Examiner* — Tammara Peyton
(74) *Attorney, Agent, or Firm* — Thomas, Kayden, Horstemeyer & Risley, LLP

(57) ABSTRACT

A system and method for dual mode DP and HDMI transmission are provided. Briefly described, one embodiment of a dual mode DP and HDMI transmitter, among others, can be implemented as follows. The dual mode DP and HDMI transmitter comprises a driver circuit controlled by a data signal. The dual mode DP and HDMI transmitter also comprises a control circuit coupled to the driver circuit. The control circuit is configurable to transmit the data signal in a DP mode or a HDMI mode according to a mode signal. One embodiment of a method, among others, comprises: receiving a mode signal; determining whether to configure the dual mode DP and HDMI transmitter for transmitting in a DP mode or an HDMI mode based on the received mode signal; and configuring a dual mode DP and HDMI transmitter in accordance with the determination.

24 Claims, 5 Drawing Sheets

DUAL MODE DISPLAYPORT (DP) AND HIGH DEFINITION MULTIMEDIA INTERFACE (HDMI) TRANSMITTER CONFIGURED TO TRANSMIT VIDEO AND/OR AUDIO SIGNALS IN DP OR HDMI ACCORDING TO MODE SIGNAL

The present application is a continuation application of U.S. patent application Ser. No. 12/365,259 filed on Feb. 4, 2009, now U.S. Pat. No. 8,019,906, the disclosure of which is incorporated by reference herein in its entirety.

TECHNICAL FIELD

The present disclosure is generally related to data transmission and, more particularly, is related to a dual mode transmitter and method for transmitting data according to DisplayPort (DP) standard or High Definition Multimedia Interface (HDMI) standard.

BACKGROUND

An audio/visual signal can be communicated from a computing device to a display via a cable. For example, FIG. 1 is a front view of a personal computer 100 including a cable 130 connecting a computing device 110 and a display 120, such as a liquid crystal display (LCD) or plasma screen. Different standards, such as the DP standard or the HDMI standard, may be used for communicating the audio/visual signal from the computing device to the display. Under the DP standard, the transmission protocol is based on micro packets and is extensible for future feature additions, whereas the HDMI transmission protocol is a serial data stream at a 10× pixel clock rate. Also, for the DP standard, the transmission is an alternating current (AC) transmission in a voltage range of 400 mV-1200 mV. For the HDMI standard, the transmission is a direct current (DC) transmission in a voltage range of 1000 mV-1200 mV.

Each standard has advantages and disadvantages. DP supports both external (e.g., desktop) and internal (e.g., laptop) display connections whereas HDMI does not. Unlike DP, however, HDMI supports xvYCC color space, Dolby True High Definition (DolbyTrueHD), Digital Theater Systems-High Definition (DTS-HD) Master Audio bitstream, Consumer Electronics (CE) control signals, and compatibility with Digital Visual Interface (DVI). Given the different capabilities of the DP and HDMI standards, it may be useful to change data from one standard to another standard for a particular application.

FIG. 2 is a block diagram of the personal computer 100 illustrated in FIG. 1 including a conventional configuration for changing a DP transmission to an HDMI transmission using a level shifter 114. The computing device 110 includes a DP transmitter 112, whereas the display 120 includes an HDMI interface. Therefore, the DP data signal outputted by the DP transmitter 112 is changed, using a level shifter 114, into an HDMI data signal compatible with the HDMI interface on the display 120.

Specifically, referring to FIG. 2, the computing device 110 includes a system board 115. The system board 115 includes a graphics processing chip 111, a DP component 113, and a level shifter 114. The graphics processing chip 111 includes the DP transmitter 112, and the DP component 113 is coupled to the DP transmitter 112. The level shifter 114 receives the output of the DP component 113, changes the voltage level and current, and outputs an HDMI data signal. The HDMI data signal is communicated from the computing device 110 to the display 120.

In the conventional configuration illustrated in FIG. 2, the level shifter 114 is not located in the graphics processing chip 111 and is a separate chip located on the system board 115. Because the level shifter 114 is external to the graphics processing chip 111, the level shifter 114 takes up valuable hardware space in the computing device 110 and adds additional cost. Similarly, in the case of changing an HDMI data signal to a DP data signal according to a conventional configuration, an HDMI component and a level shifter external to the graphics processing chip are necessary. These external items occupy space on the system board 115, and the conventional configuration is an expensive, bulky solution for changing between HDMI transmission and DP transmission.

FIG. 3 is a circuit diagram of the conventional configuration illustrated in FIG. 2. The circuit diagram illustrates a conventional configuration for changing from DP transmission to HDMI transmission using a level shifter 114. The switching elements SN2, SN3 are controlled by a data signal D1 whereas switching elements SN1, SN4 are controlled by a complementary data signal D1 bar. Switching elements SN1 and SN2 are coupled to a current source, which is tied to ground. Switching elements SN3 and SN4 are coupled to a current source, which is biased at 2V. Switching elements SN1 and SN3 are coupled together, and switching elements SN2 and SN4 are also coupled together. Also shown in FIG. 3 is a DP component 113 including two resistors R31, R32 biased at 0.7V, and each resistor R31, R32 is coupled to a junction between the coupled switching elements (e.g., SN1 and SN3; SN2 and SN4) as illustrated in FIG. 3. Also coupled to each junction between the coupled switching elements (e.g., SN1 and SN3; SN2 and SN4) is a capacitor C31, C32. Further, in FIG. 3, a level shifter 114 is coupled to the capacitors C31, C32 as illustrated, and the output of the level shifter 114 is delivered to the receiver 121, included in the display 120 illustrated in FIG. 1. As discussed above with respect to FIG. 2, the level shifter 114 is externally used on system board for changing DP transmission to HDMI transmission. In addition, the level shifter 114 consumes valuable hardware space and the configuration is an expensive solution.

SUMMARY

Embodiments of the present disclosure provide a system and method for dual mode DP and HDMI transmission. Briefly described, one embodiment of a dual mode DP and HDMI transmitter, among others, can be implemented as follows. The dual mode DP and HDMI transmitter comprises a driver circuit controlled by a data signal. The dual mode DP and HDMI transmitter also comprises a control circuit coupled to the driver circuit. The control circuit is configurable to transmit the data signal in a DP mode or an HDMI mode according to a mode signal.

The present disclosure can also be viewed as providing methods for dual mode DP and HDMI mode transmission. In this regard, one embodiment of such a method, among others, can be broadly summarized by the following steps: receiving a mode signal; determining whether to configure the dual mode DP and HDMI transmitter for transmitting in a DP mode or an HDMI mode based on the received mode signal; and configuring the dual mode DP and HDMI transmitter in accordance with the determination.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The following disclosure describes systems and/or methods for dual mode DisplayPort (DP) and High Definition Multimedia Interface (HDMI) transmission. A dual mode DP and HDMI transmitter can be included as an integrated circuit on a graphics processing chip. The dual mode DP and HDMI transmitter can be configured to transmit in a DP mode or an HDMI mode depending on the type of interface in a display of a personal computer. The dual mode DP and HDMI transmitter is configured by applying a mode signal to the transmitter, and the mode signal is saved on a register in a chipset. Once the dual mode DP and HDMI transmitter is configured to transmit in the DP mode or the HDMI mode, a DP component or HDMI component can be coupled to the transmitter depending on the configuration. The configured dual mode DP and HDMI transmitter and the appropriate coupled component are included in a computing device, which transmits an audio/visual signal according to the selected mode to a display. The dual mode DP and HDMI transmitter eliminates the need for the external level shifter discussed above, and thus, the required hardware space in a computing device may be reduced. Additionally, because an external level shifter is not needed, expenses associated with the level shifter can be saved.

Figure 1:
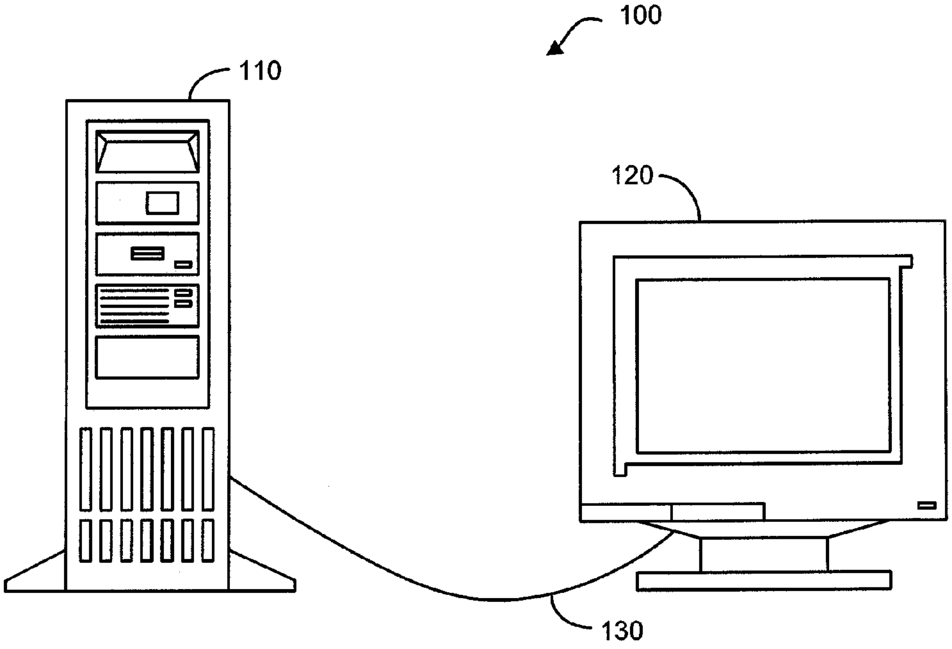
FIG. 1 is a front view of a personal computer.
Figure 2:
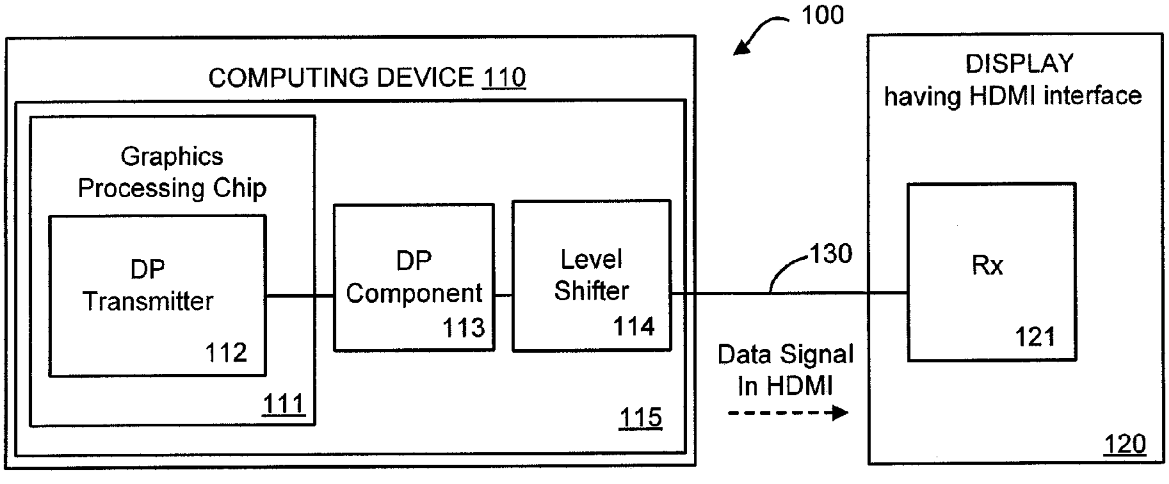
FIG. 2 is a block diagram of the personal computer illustrated in FIG. 1 and illustrates a conventional configuration for changing a DP transmission to a HDMI transmission using a level shifter.
Figure 3:
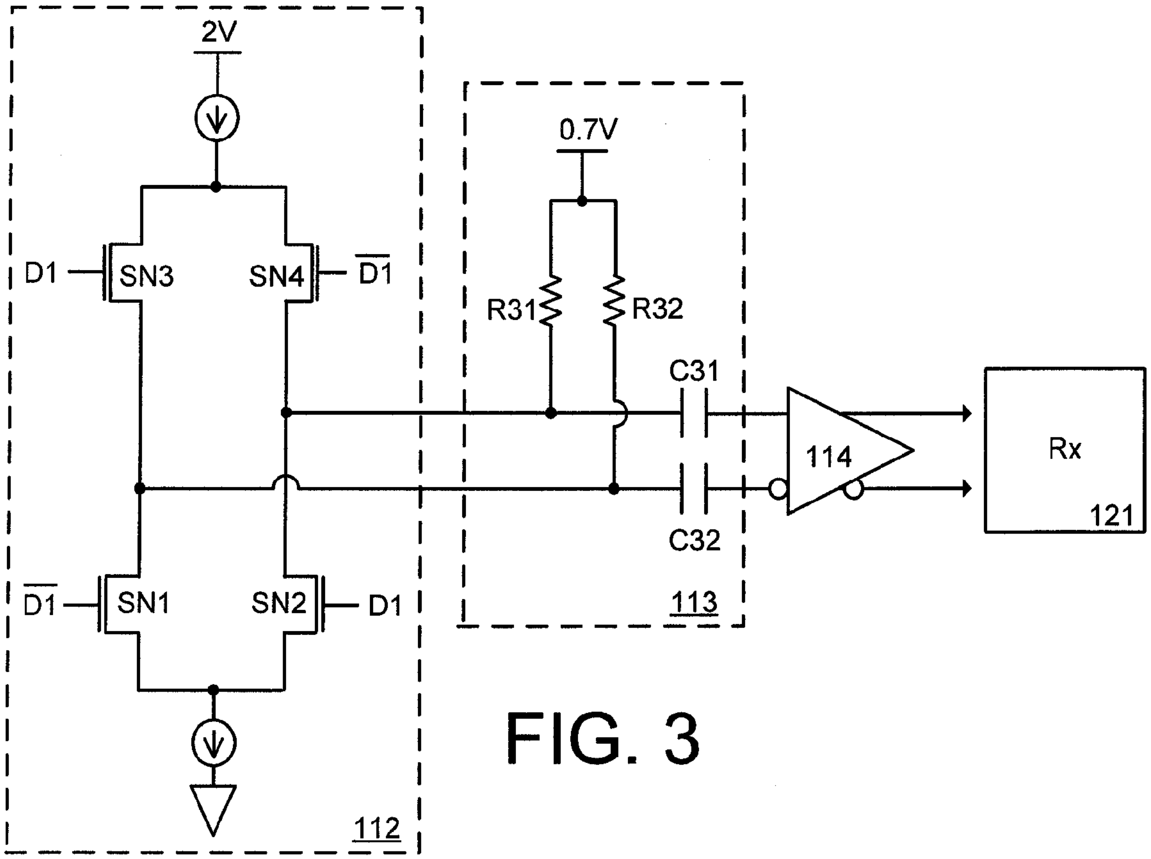
FIG. 3 is a circuit diagram illustrating the conventional configuration depicted in FIG. 2.
Figure 4:
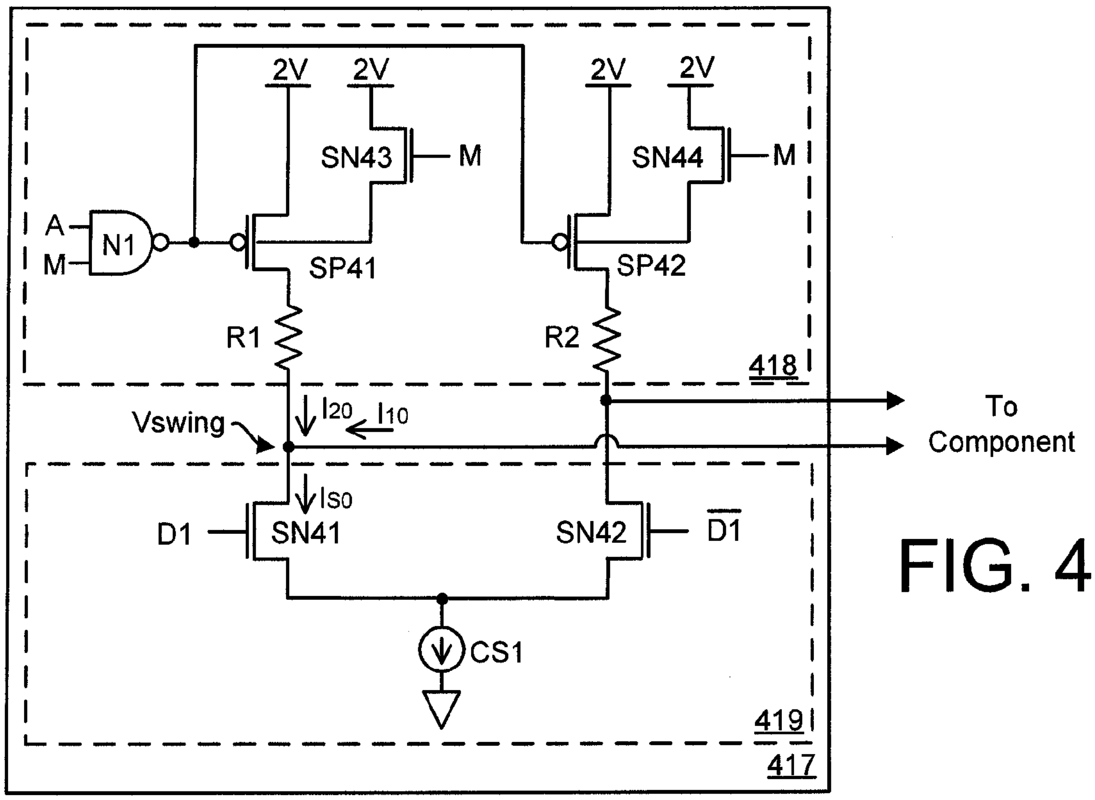
FIG. 4 is a circuit diagram of an embodiment of a dual mode DP and HDMI transmitter.

FIG. 4 is a circuit diagram of an embodiment of a dual mode DP and HDMI transmitter 417. The dual mode DP and HDMI transmitter 417 in the embodiment illustrated in FIG. 4 includes a driver circuit 419 and a control circuit 418. The driver circuit 419 includes switching elements SN41, SN42, which are controlled by a data signal D1 and a complementary data signal D1 bar, respectively. The data signal D1 and the complementary data signal D1 bar are in a differential form and are audio/visual signals.

The control circuit 418 includes resistors R1, R2 coupled to switching elements SP41, SP42, respectively, which are coupled to a 2V bias. In the embodiment, the substrate of switching elements SP41, SP42 is coupled to switching elements SN43, SN44, and switching elements SN43, SN44 each receive the mode signal M as input. Switching elements SN43, SN44 are coupled to the 2V bias. Switching elements SP41 and SP42 are each controlled by the output of a NAND gate N1, which has the mode signal M and a resistance calibration signal A for inputs. In the embodiment, the dual mode DP and HDMI transmitter 417 illustrated in FIG. 4 is an integrated circuit included on a graphics processing chip.

As mentioned above, the dual mode DP and HDMI transmitter 417 is configurable by the application of a mode signal M. When the mode signal M has a logical value of "1," which in this nonlimiting example indicates the mode for transmission is the DP mode, the resistors R1, R2 are coupled to 2V because current flows through the switching elements SN43, SN44, SP41, SP42. Therefore, in DP mode, $I_{S0}=I_{10}+I_{20}$ and Vswing=IR/2. As a result, the dual mode DP and HDMI transmitter 417 is configured to transmit in the DP mode. When the mode signal M has a logical value of "0," which in this nonlimiting example indicates the mode for transmission is the HDMI mode, the resistors R1, R2 are decoupled from 2V because current cannot flow through the switching elements SN43, SN44, SP41, SP42. Therefore, in HDMI mode, $I_{S0}=I_{10}=\sim 10$ mA; $I_{20}=0$ mA; and Vswing=IR. As a result, the dual mode DP and HDMI transmitter 417 is configured to transmit in the HDMI mode.

In some embodiments, the resistors R1, R2 in the control circuit 418 are poly resistors. In addition, the switching elements SP41, SP42 are metal-oxide-semiconductor field-effect-transistor (MOSFET) resistors, and in particular, PMOS resistors. In some embodiments, there may be a plurality of PMOS resistors in series. Further, in some embodiments, there may be a plurality of poly resistors in series. The current flow through switching elements SP41, SP42 is calibrated by the output of the NAND gate N1, which receives the resistance calibration signal A as an input. In this way, the effective resistance of a circuit path including a MOSFET resistor and a poly resistor is calibrated to 50 ohms. At the connection for the component, the PMOS parasitic capacitance is mitigated, and therefore, the overall RC time constant is reduced. In other words, the combination of the MOSFET resistors and poly resistors reduce parasitic capacitances and, thus, enable high frequencies of operation.

Figure 5:
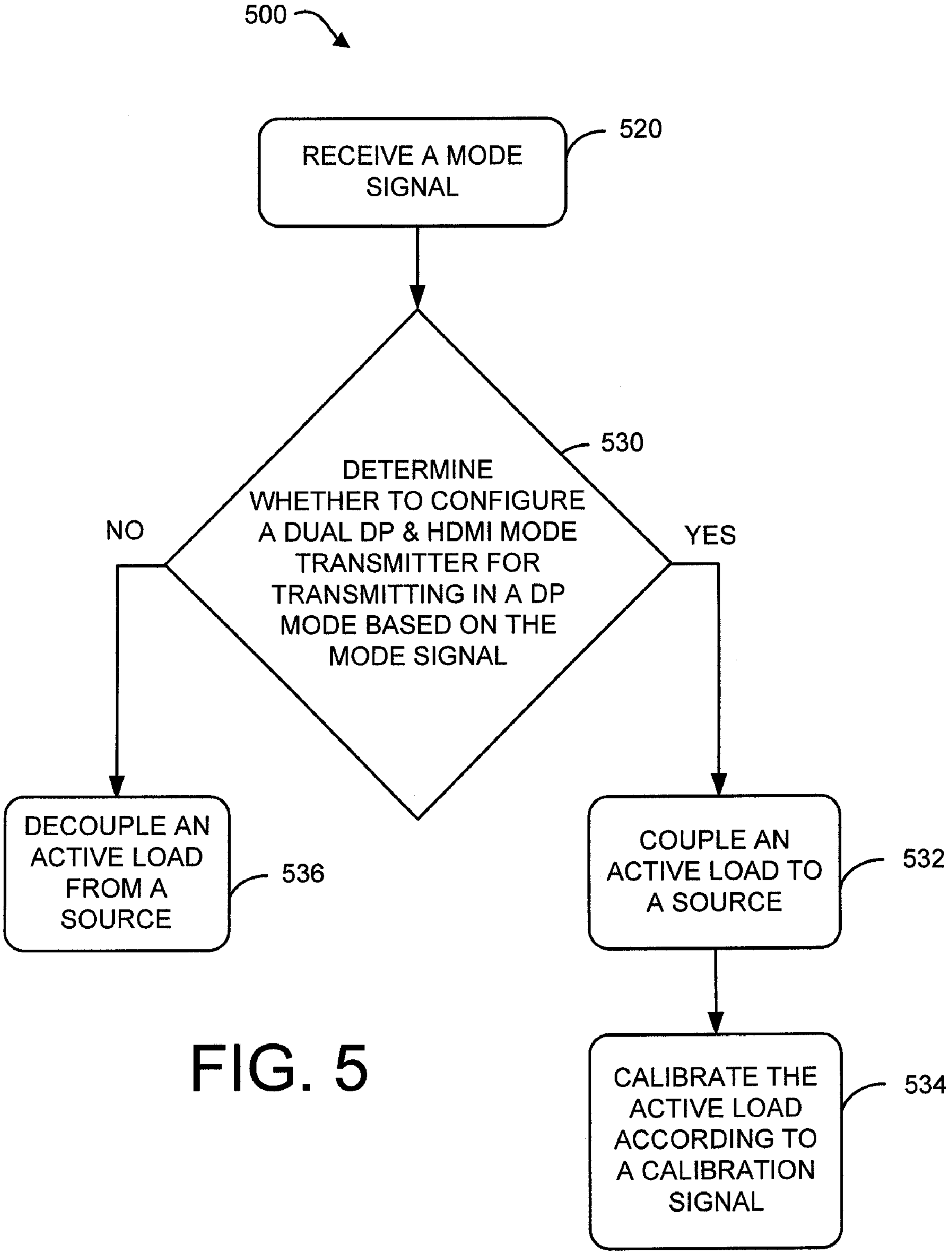
FIG. 5 is a flow chart illustrating an embodiment of a method for configuring a dual mode DP and HDMI transmitter.

FIG. 5 is a flow chart illustrating an embodiment of a method 500 for configuring a dual mode DP and HDMI transmitter 417. The method 500 includes blocks 520, 530, 532, 534, and 536. Referring to FIGS. 4 and 5, in block 520, a mode signal M is received at a dual mode DP and HDMI transmitter 417. In the embodiment, the mode signal M is stored in a register in a chipset. The chipset includes a graphic processing chip, and the graphics processing chip includes the dual mode DP and HDMI transmitter 417.

In block 530, a determination whether to configure the dual mode DP and HDMI transmitter 417 for transmitting in a DP mode or an HDMI mode is made. The determination is made using the control circuit 418 based on the received mode signal M. Specifically, the output of the NAND gate N1, which receives the mode signal M, controls switching elements SP41, SP42, and the switching elements SN43, SN44 are controlled by the mode signal M.

In block 532, the dual mode DP and HDMI transmitter is configured in accordance with the determination. For example, responsive to the determination being to configure the dual mode DP and HDMI transmitter 417 to transmit in a DP mode, an active load is coupled to a source. In the embodiment, the active load is 50 ohms. Referring to FIG. 4, the resistors R1, R2 are coupled to the 2V bias because the switching elements SP41, SP42, SN43, SN44 are conducting current based on the determination discussed with respect to block 530. The dual mode DP and HDMI transmitter 417 that results from block 532 is configured to transmit in the DP mode.

In block 534, the active load is calibrated according to a calibration signal A. The current flow through switching elements SP41, SP42 is calibrated by the output of NAND gate N1, which receives the resistance calibration signal A as an input. In this way, the effective resistance of each circuit path including a MOSFET resistor and a poly resistor can be calibrated to 50 ohms. At the connection for the component, the PMOS parasitic capacitance is mitigated, and therefore, the overall RC time constant is reduced. In other words, the combination of the MOSFET resistors and poly resistors reduce parasitic capacitances and, thus, enable high frequencies of operation. Block 532 and block 534 may be performed at the same time when the mode signal is set to DP mode.

In block 536, the dual mode DP and HDMI transmitter is configured in accordance with the determination. For example, responsive to the determination being to configure the dual mode DP and HDMI transmitter 417 to transmit in a HDMI mode, an active load is decoupled from a source. Referring to FIG. 4, the resistors R1, R2 and switching elements SP41, SP42, SN43, SN44 are decoupled from the 2V bias because the switching elements SP41, SP42, SN43, SN44 are not conducting current based on the determination discussed with respect to block 530. The dual mode DP and HDMI transmitter 417 that results from block 536 is configured to transmit in the HDMI mode.

Figure 6:
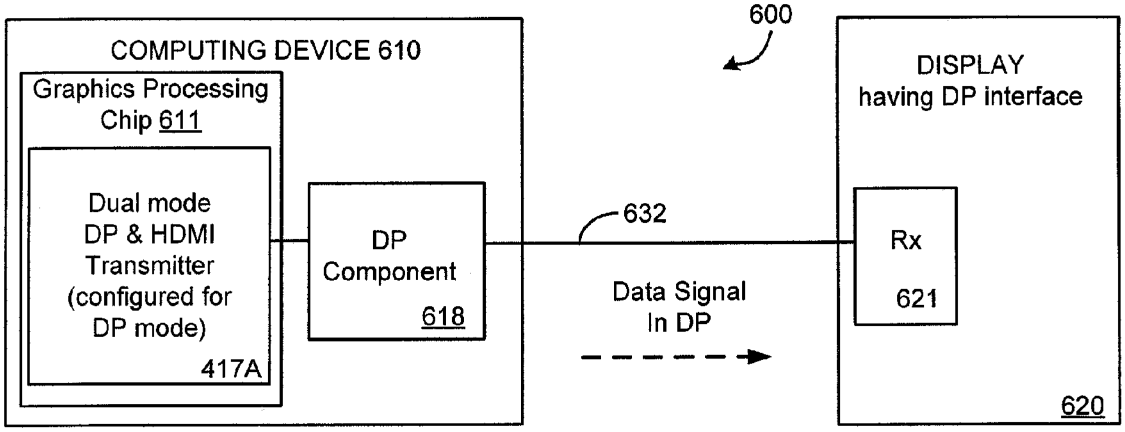
FIG. 6 is a block diagram illustrating a first embodiment of a personal computer.

FIG. 6 is a block diagram illustrating a first embodiment of a personal computer 600. The personal computer 600 includes a computing device 610, a display 620, and a cable 632 coupling the computing device 610 to a receiver 621 included in the display 620. The display 620 has a DP interface. The computing device 610 includes a graphics processing chip 611, which is an integrated circuit including the dual mode DP and HDMI transmitter 417A. In the embodiment, the graphics processing chip 611 is included in a chipset. The dual mode DP and HDMI transmitter 417 described in FIG. 4 is configured to be a dual mode DP and HDMI transmitter 417A configured to transmit in DP mode according to a mode signal M. The chipset includes the mode signal M stored in a register. The dual mode DP and HDMI transmitter 417A is coupled to a DP component 618, which is also included in the computing device 610. Both the graphics processing chip 611 and the DP component 618 may be coupled to a system board in the computing device 610. A DP data signal may be transmitted from the computing device 610 to the display 620 via the cable 632 when the personal computer is in operation.

Figure 7:
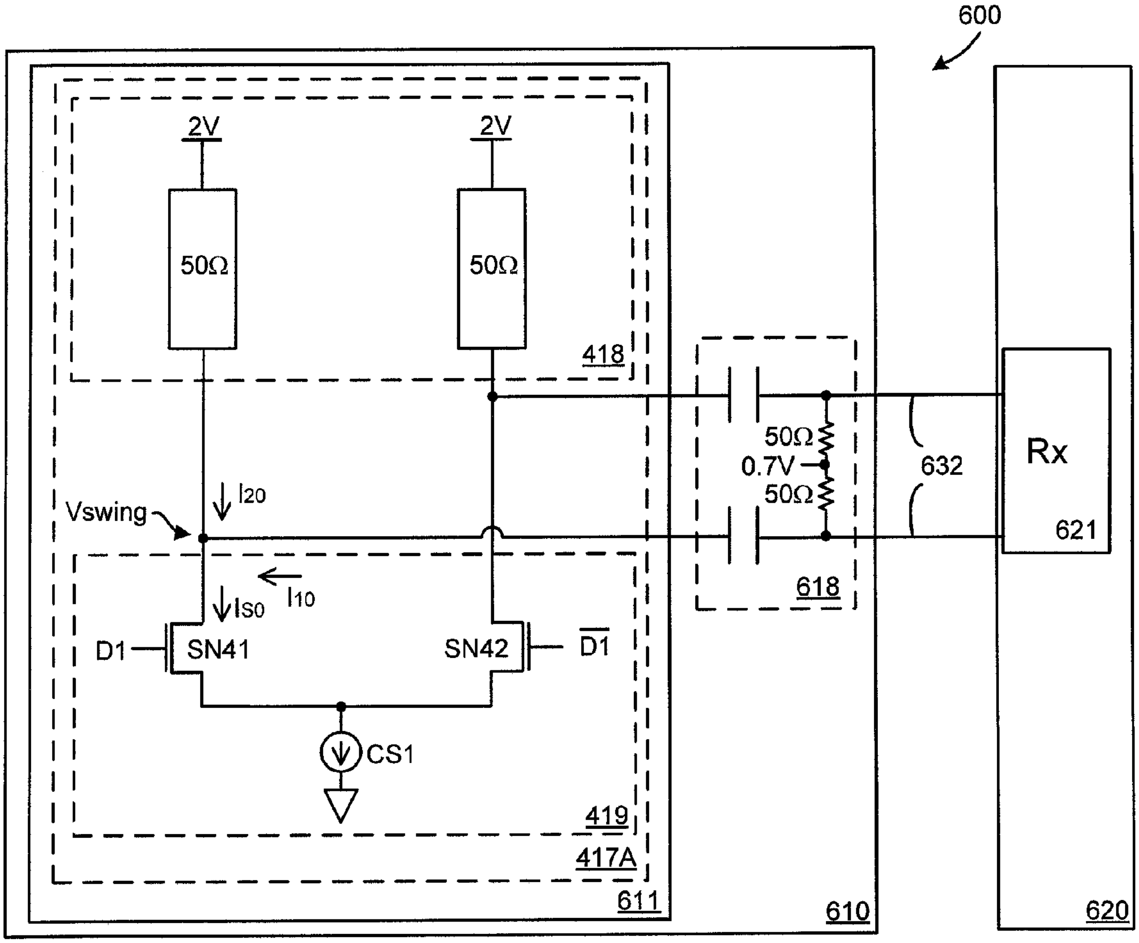
FIG. 7 is a circuit diagram illustrating the first embodiment of the personal computer depicted in FIG. 6.

FIG. 7 is a circuit diagram illustrating the first embodiment of the personal computer 600 depicted in FIG. 6. The dual mode DP and HDMI transmitter 417A is configured to transmit in DP mode (M=1), and as discussed above with respect to FIG. 4, the dual mode DP and HDMI transmitter 417A includes a driver circuit 419 controlled by a data signal D1 and a complementary data signal D1 bar in differential form. Further, the dual mode DP and HDMI transmitter 417A also includes a control circuit 418 coupled to the driver circuit 419. Because the dual mode DP and HDMI transmitter 417A is configured to transmit in a DP mode, the active load has been coupled to the source. Specifically, the resistors R1, R2 are coupled to the 2V bias because the switching elements SP41, SP42, SN43, SN44 are conducting current. Therefore, in DP mode, $I_{S0}=I_{10}+I_{20}$ and Vswing=IR/2.

Also included in the computing device 610 is a DP component 618 coupled to the dual mode DP and HDMI transmitter 417A configured to transmit in DP mode. The DP component 618 includes two capacitors in parallel and two resistors in series as shown in FIG. 7. The biased voltage between the two resistors is 0.7V, and the two resistors are each 50 ohm resistors. The capacitors of the DP component 618 are coupled to the connections between the driver circuit 419 and the control circuit 418 as illustrated. The output of the DP component 618 is communicated over cable 632 to the receiver 621. The DP component 618 may be added by the customer. The output of the DP component 618 is coupled via a cable 632 to the receiver 621 of the display 620, which includes DP interface.

According to the first embodiment of a personal computer illustrated in FIGS. 6 and 7, the dual mode DP and HDMI transmitter 417A configured to transmit in a DP mode includes a driver circuit 419 controlled by a data signal D1 and a complementary data signal D1 bar in differential form. The dual mode DP and HDMI transmitter 417A configured to transmit in a DP mode provides the appropriate biasing and resistance for DP mode by the control circuit 418 in combination with the DP component 618. Specifically, the control circuit 418 provides biasing of 2V and an effective resistance of 50 ohms. As would be understood by a person having ordinary skill in the art, a DP data signal is then communicated as an output of the DP component 618 to the display 620.

Figure 8:
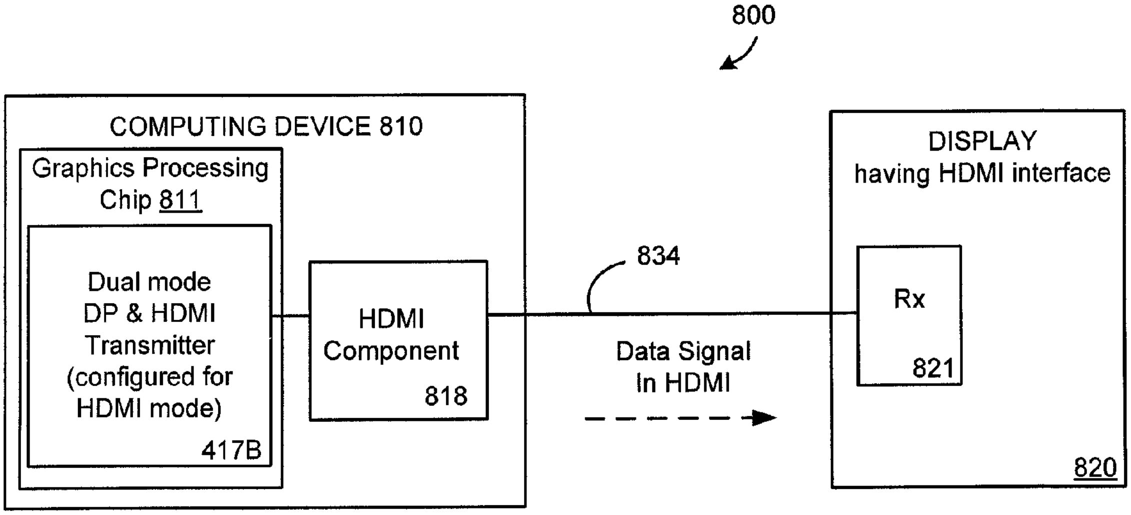
FIG. 8 is a block diagram illustrating a second embodiment of a personal computer.

FIG. 8 is a block diagram illustrating a second embodiment of a personal computer 800. The personal computer 800 includes a computing device 810, a display 820, and a cable 834 coupling the computing device 810 to a receiver 821, which is included in the display 820. The display 820 has an HDMI interface. The computing device 810 includes a graphics processing chip 811, which is an integrated circuit including the dual mode DP and HDMI transmitter 417B. In the embodiment, the graphics processing chip 811 is included in a chipset. The dual mode DP and HDMI transmitter 417 described in FIG. 4 is configured to be a dual mode DP and HDMI transmitter 417B configured to transmit in HDMI mode according to a mode signal M. The chipset includes the mode signal M stored in a register. The dual mode DP and HDMI transmitter 417B is coupled to an HDMI component 818, which is also included in the computing device 810. Both the graphics processing chip 811 and the HDMI component 818 may be coupled to a system board in the computing device 810. An HDMI data signal may be transmitted from the computing device 810 to the display 820 via the cable 834 when the personal computer is in operation.

Figure 9:
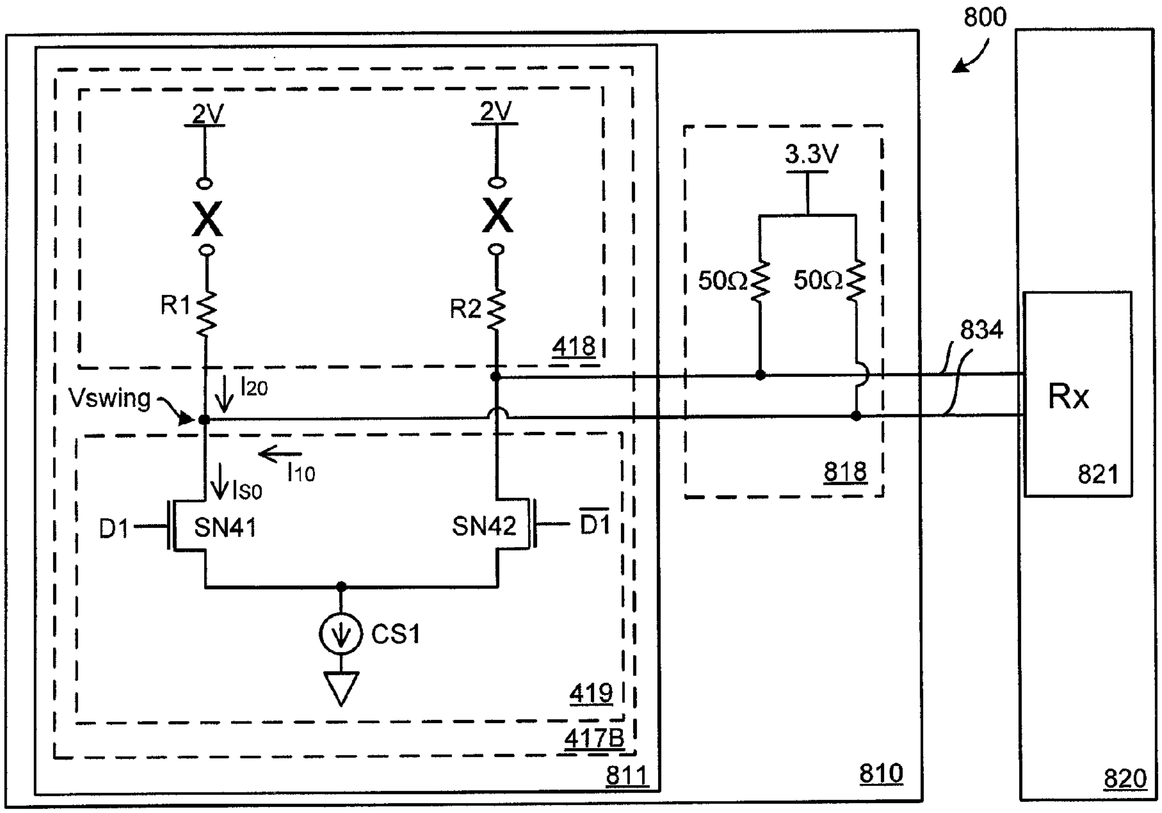
FIG. 9 is a circuit diagram illustrating the second embodiment of the personal computer depicted in FIG. 8.

FIG. 9 is a circuit diagram illustrating the second embodiment of the personal computer 800 depicted in FIG. 8. The dual mode DP and HDMI transmitter 417B is configured to transmit in HDMI mode (M=0). The dual mode DP and HDMI transmitter 417B includes a driver circuit 419 controlled by a data signal D1 and a complementary data signal D1 bar in a differential form. Further, the dual mode DP and HDMI transmitter 417B also includes a control circuit 418 coupled to the driver circuit 419. Because the dual mode DP and HDMI transmitter 417B is configured to transmit in a HDMI mode, the active load has been decoupled from the source. Specifically, the resistors R1, R2 are decoupled from the 2V bias because the switching elements SP41, SP42, SN43, SN44 are not conducting current. Therefore, in HDMI mode, there is an open circuit between the 2V bias and each of the resistors R1, R2. Hence in HDMI mode, $I_{S0}=I_{10}=\sim10$ mA; $I_{20}=0$ mA; and Vswing=IR.

Also included in the computing device 810 is a HDMI component 818 coupled to the dual mode DP and HDMI transmitter 417B configured to transmit in HDMI mode. The HDMI component 818 includes two resistors biased at 3.3V as shown in FIG. 9, and the two resistors are each 50 ohm resistors. The output of the HDMI component 818 is communicated over cable 834 to the receiver 821 in the display 820, which includes an HDMI interface.

According to the second embodiment illustrated in FIGS. 8 and 9, dual mode DP and HDMI transmitter 417B configured to transmit in a HDMI mode receives a data signal D1 and a complementary data signal D1 bar in differential form at the driver circuit 419. The dual mode DP and HDMI transmitter 417B configured to transmit in a HDMI mode then provides the appropriate biasing and resistance for HDMI mode in combination with the HDMI component 818. Specifically, there is an open circuit between the 2V bias and each of the resistors R1, R2. As would be understood by a person having ordinary skill in the art, an HDMI data signal is then communicated as an output of the HDMI component 818 to the display 820.

In some embodiments, each of the switching elements comprise a solid state switch such as a transistor, etc. Specifically, MOSFET transistors or other types of transistors are employed. Alternatively, other types of switching elements may be employed such as switches or other elements may be used. The switching elements are operatively coupled to and are manipulated by one or more control inputs.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A dual mode transmitter, configured to transmit a data signal in a first mode or a second mode, comprising:

a driver circuit controlled by the data signal; and an active load circuit coupled to the driver circuit for transmitting the data signal, wherein the active load circuit is configured as a resistive circuit and coupled to the driver circuit for transmitting the data signal in the first mode, wherein the active load circuit is configured as an open circuit and decoupled from the driver circuit for transmitting the data signal in the second mode.

2. The dual mode transmitter of claim 1, wherein a voltage transmission range of the data signal in the second mode is lager than a voltage transmission range of the data signal in the first mode.

3. The dual mode transmitter of claim 1, wherein the first mode is a DisplayPort (DP) mode, and the second mode is a HDMI mode.

4. The dual mode transmitter of claim 1, wherein the active load circuit comprises a plurality of switching elements and a plurality of resistors that selectively couple to a source.

5. The dual mode transmitter of claim 4, wherein a resistance of a combination of the switching elements and the resistors included in the active load circuit is calibrated to a resistance associated with a voltage transmission range of the data signal in the first mode.

6. The dual mode transmitter of claim 1, wherein the active load circuit comprises a third switching element and a fourth switching element, and wherein the data signal is transmitted in the first mode, the third switching element and the fourth switching element are turned on, wherein the data signal is transmitted in the second mode, the third switching element and the fourth switching element are turned off.

7. The dual mode transmitter of claim 1, wherein the active load circuit comprises a first resistor and a second resistor, and wherein the data signal is transmitted in the first mode, the first resistor and the second resistor are coupled to the driver circuit, wherein the data signal is transmitted in the second mode, the first resistor and the second resistor are decoupled from the driver circuit.

8. A computer comprising:

a dual mode transmitter, configured to transmit a data signal in a first mode or in a second mode, wherein the dual mode transmitter comprises:

a driver circuit controlled by the data signal; and an active load circuit coupled to the driver circuit for transmitting the data signal, wherein the dual mode transmitter is configured by the active load circuit configured as a resistive load for transmitting the data signal in the first mode, wherein the dual mode transmitter is configured by the active load circuit configured as an open circuit decoupled from the driver circuit for transmitting the data signal in the second mode.

9. The computer of claim 8, wherein a voltage transmission range of the data signal in the second mode is lager than a voltage transmission range of the data signal in the first mode.

10. The computer of claim 8, wherein the first mode is a DisplayPort (DP) mode, and the second mode is a HDMI mode.

11. The computer of claim 10, wherein the dual mode transmitter is configured to transmit in the DP mode, the computer further comprising:

a DP component coupled to the dual mode transmitter; and a display including a DP interface, wherein the display is coupled to the DP component.

12. The computer of claim 10, wherein the dual mode transmitter is configured to transmit in the HDMI mode, the computer further comprising:

a HDMI component coupled to the dual mode transmitter; and a display including a HDMI interface, wherein the display is coupled to the HDMI component.

13. The computer of claim 8, further comprising a chipset including a graphics processing chip, wherein the graphics processing chip comprises the dual mode transmitter.

14. The computer of claim 8, wherein the active load circuit comprises a plurality of resistors and a plurality of switching elements that selectively coupled to a source.

15. The computer of claim 14, wherein a resistance of a combination of the switching elements and the resistors included in the active load circuit is calibrated to a resistance associated with a voltage transmission range of the data signal in the first mode.

16. The computer of claim 8, wherein the active load circuit comprises a third switching element and a fourth switching element, and wherein the data signal is transmitted in the first mode, the third switching element and the fourth switching element are turned on, wherein the data signal is transmitted in the second mode, the third switching element and the fourth switching element are turned off.

17. The computer of claim 8, wherein the active load circuit comprises a first resistor and a second resistor, and wherein the data signal is transmitted in the first mode, the first resistor and the second resistor are coupled to the driver circuit, wherein the data signal is transmitted in the second mode, the first resistor and the second resistor are decoupled from the driver circuit.

18. A method, for transmitting a data signal in a dual mode transmitter, the method comprising:

determining whether to configure the dual mode transmitter for transmitting a data signal in first mode or in second mode; and configuring the dual mode transmitter in accordance with the determination, comprising:

coupling an active load circuit configured as a resistive load to a driver circuit for transmitting the data signal in the first mode; and decoupling the active load circuit configured as an open circuit from the driver circuit for transmitting the data signal in the second mode.

19. The method of claim 18, wherein a voltage transmission range of the data signal in the second mode is lager than a voltage transmission range of the data signal in the first mode.

20. The method of claim 18, wherein the first mode is a DisplayPort (DP) mode, and the second mode is a HDMI mode.

21. The method of claim 18, further comprising:

calibrating a resistance of a combination of a plurality of switching elements and a plurality of resistors included in the active load circuit to a resistance associated with a voltage transmission range of the data signal in the first mode.

22. The method of claim 18, wherein the configuring step further comprises:

turning on a third switching element and a fourth switching element included in the active load circuit when the data signal is transmitted in the first mode; and turning off the third switching element and the fourth switching element when the data signal is transmitted in the second mode.

23. The method of claim 18, wherein the configuring step further comprises:

coupling a first resistor and a second resistor included in the active load circuit to the driver circuit when the data signal is transmitted in the first mode; and decoupling the first resistor and the second resistor from the driver circuit when the data signal is transmitted in the second mode.

24. A dual mode transmitter, configured to transmit a data signal in a DP mode or HDMI mode, comprising:

an active load circuit; and a driver circuit controlled by the data signal, wherein the driver circuit is coupled to a resistive active-load circuit for transmitting the data signal in the DP mode, wherein the driver circuit is coupled to an open circuit node for transmitting the data signal in the HDMI mode.

* * * * *